US011134116B2

(12) United States Patent
Cepuran

(10) Patent No.: US 11,134,116 B2
(45) Date of Patent: Sep. 28, 2021

(54) SYSTEM AND METHOD FOR DYNAMICALLY LOADING A WEBPAGE

(71) Applicant: D2L CORPORATION, Kitchener (CA)

(72) Inventor: Brian Cepuran, Kitchener (CA)

(73) Assignee: D2L Corporation, Kitchener (CA)

( * ) Notice: Subject to any disclaimer, the term of this patent is extended or adjusted under 35 U.S.C. 154(b) by 1082 days.

(21) Appl. No.: 14/049,801

(22) Filed: Oct. 9, 2013

(65) Prior Publication Data
US 2014/0280719 A1   Sep. 18, 2014

Related U.S. Application Data

(60) Provisional application No. 61/786,978, filed on Mar. 15, 2013.

(51) Int. Cl.
*H04L 29/08*   (2006.01)

(52) U.S. Cl.
CPC .................. *H04L 67/02* (2013.01)

(58) Field of Classification Search
CPC ....................................... H04L 67/02
USPC .......................................... 709/217
See application file for complete search history.

(56) References Cited

U.S. PATENT DOCUMENTS

| 7,548,982 | B2* | 6/2009 | Gu ................. G06F 17/30902 709/217 |
| 2002/0184363 | A1* | 12/2002 | Viavant ............. H04L 12/2602 709/224 |
| 2005/0138140 | A1* | 6/2005 | Wen ................. G06F 17/30902 709/217 |
| 2011/0055413 | A1* | 3/2011 | Lobsenz ............. G06Q 10/06 709/231 |
| 2011/0302485 | A1* | 12/2011 | D'Angelo ........... G06Q 10/10 715/234 |
| 2014/0280472 | A1* | 9/2014 | Riviello ................ H04L 67/02 709/203 |

* cited by examiner

*Primary Examiner* — Wing F Chan
*Assistant Examiner* — Leon Y Tseng
(74) *Attorney, Agent, or Firm* — Gowling WLG (Canada) LLP; Neil W. Henderson

(57) ABSTRACT

A system for dynamically loading a webpage including: a webpage qualifier module to receive a user requested webpage from a host server and further to identify a plurality of components of the webpage; a component selection module to determine a loading method for each component, wherein the loading method may be either in-line loading or adaptive loading; an in-line loading module to load components in-line; and an adaptive loading module to determine a loading hierarchy and load components based on the loading hierarchy. A method for dynamically loading a webpage including: identifying a plurality of components of the webpage; determining a load method for each component wherein the loading method may be in-line loading or adaptive loading; loading components determined to be in-line components using in-line loading; determining a loading hierarchy for components determined to be adaptive components; and loading adaptive components using adaptive loading based on the loading hierarchy.

20 Claims, 3 Drawing Sheets

SYSTEM AND METHOD FOR DYNAMICALLY LOADING A WEBPAGE

CROSS REFERENCE TO RELATED APPLICATIONS

This application claims the benefit of priority of U.S. Provisional Patent Application No. 61/786,978 filed Mar. 15, 2013, which is incorporated herein by reference in its entirety.

FIELD

The present disclosure relates generally to system and method for loading components of a webpage. More particularly, the present disclosure relates to method and system for using various loading techniques to load components of a webpage.

BACKGROUND

In order to access the Internet, a user will typically use a browser software application on a computer to locate, retrieve, load, render and display webpage content. Browsers are generally software applications that can load webpages includeing various content formats situated on host servers. The browser communicates over the Internet to a host server, via, for example, HyperText Transfer Protocol (HTTP) or other transfer protocols, requesting that the webpage content be sent to the user's computer. The browser then receives the content from the host server, which the browser loads, renders and displays to the user.

Often, the data content that is received by the browser is delivered or served to the browser in components and, possibly, sub-components, sometimes referred to as objects or widgets. Components or sub-components may be objects on a webpage interface, such as buttons, frames, menus, forms, and/or the like, sometimes including code that can be executed within the webpage.

One of the key factors in a user's webpage viewing experience is the load time for a webpage. The faster the load time, the better the user experience. In order to give the experience of improved load times, some methods according to the related art have made use of load order to attempt to load components such as text first and then components such as images later. Other methods involve progressive loading such as when an image is loaded at low resolution and then converted to higher resolution as additional data is received. Further, particularly in dealing with mobile devices, adaptive loading can involve making changes to the content at the server side based on properties such as client side (mobile device) screen resolution or the like.

As website content becomes more and more complex and mobile users become more common, there remains a need for improved systems and methods of loading a webpage to continue improving the user experience.

The above information is presented as background information only to assist with an understanding of the present disclosure. No determination has been made, and no assertion is made, as to whether any of the above might be applicable as prior art with regard to the present disclosure.

SUMMARY

In a first aspect, the present disclosure provides a system for dynamically loading a webpage including: a webpage qualifier module configured to receive a user requested webpage from a host server and further configured to identify a plurality of components of the webpage; a component selection module configured to determine a loading method for each component, wherein the loading technique may be either in-line loading or adaptive loading; an in-line loading module configured to load components in-line; and an adaptive loading module configured to determine a loading hierarchy and load components based on the loading hierarchy.

In a particular case, the adaptive loading module may further include an indicator module configured to indicate to a user that a component is not fully loaded.

In some cases, the component selection module may determine the loading technique based at least in part on user preferences.

In some cases, the adaptive loading module may determine the loading hierarchy based on metrics related to resource load on the host server.

In a particular case, the adaptive loading module may determine the loading hierarchy based on metrics related to previous loading of the webpage for the user.

In some cases, the adaptive loading module may determine the loading hierarchy based on metrics related to previous loading of the webpage wherein the metrics are stored on the host server.

In other cases, the adaptive loading module may determine the loading hierarchy based on historical webpage loading assessments. In a particular case, the historical assessments are based on the history of the user. In other cases, the historical assessments are based on the history of a plurality of users.

In some cases, the adaptive loading module may determine the loading hierarchy based on user preferences.

In a further aspect, the present disclosure provides for a method for dynamically loading a webpage including: identifying a plurality of components of the webpage; determining a load method for each component wherein the loading technique may be in-line loading or adaptive loading; loading components determined to be in-line components using in-line loading; determining a loading hierarchy for components determined to be adaptive components; and loading adaptive components using adaptive loading based on the loading hierarchy.

In some cases, the loading using in-line loading may include loading the components in a predetermined order.

In some cases, determining a loading hierarchy and loading adaptive components occurs in parallel with loading in-line components.

In some cases, the method provides for indicating to a user that a component is in the process of being loaded.

In a particular case, the determining of the loading technique may be based on user selection.

In some cases, the determining of the loading technique may be based on predetermined metrics.

In some cases, the loading hierarchy may be based on at least one metric selected from the group of: current resource load on a host service; system performance of a user computing device; system performance of previous webpage loading; source code of the webpage; historical assessment of the webpage loading; and user preferences.

BRIEF DESCRIPTION OF THE DRAWINGS

Embodiments of the present disclosure will now be described, by way of example only, with reference to the attached Figures.

DETAILED DESCRIPTION

Generally, the present disclosure relates to embodiments of a method and system for dynamically loading components on a webpage. As noted above, in order to display webpage components to a user, an order is typically set in place so as to load the components in a rational sequence. The prevailing technique for loading components is to load the components in-line. In this case, the browser loads the components in the order by which the components are specified to appear on the user's display, for example, from top to bottom, text to images, or the like. Another technique is to load components adaptively, for example, in an order based on properties of the device on which the page is to be displayed. Progressive loading can then be used for particular components in either of these scenarios. It will be understood that each component of a webpage may also include sub-components and, further, that components or sub-components may not all be served from a single server. For example, a webpage server may provide the webpage layout but the layout itself may include calls to other servers for content, or the like.

Embodiments herein provide methods and systems to load components of a webpage by using a dynamic structure to take advantage of both in-line and adaptive loading and determining additional data for use in determining the loading strategy. The methods and system disclosed are intended to allow a webpage to load in a manner that allows a user to view the webpage in a more efficient manner. By dynamically loading the webpage the user may review an initial page view quickly while components are loaded in a more dynamic/controlled manner. The embodiments provided herein are intended to provide responsive interaction and positive user experience.

Figure 1:
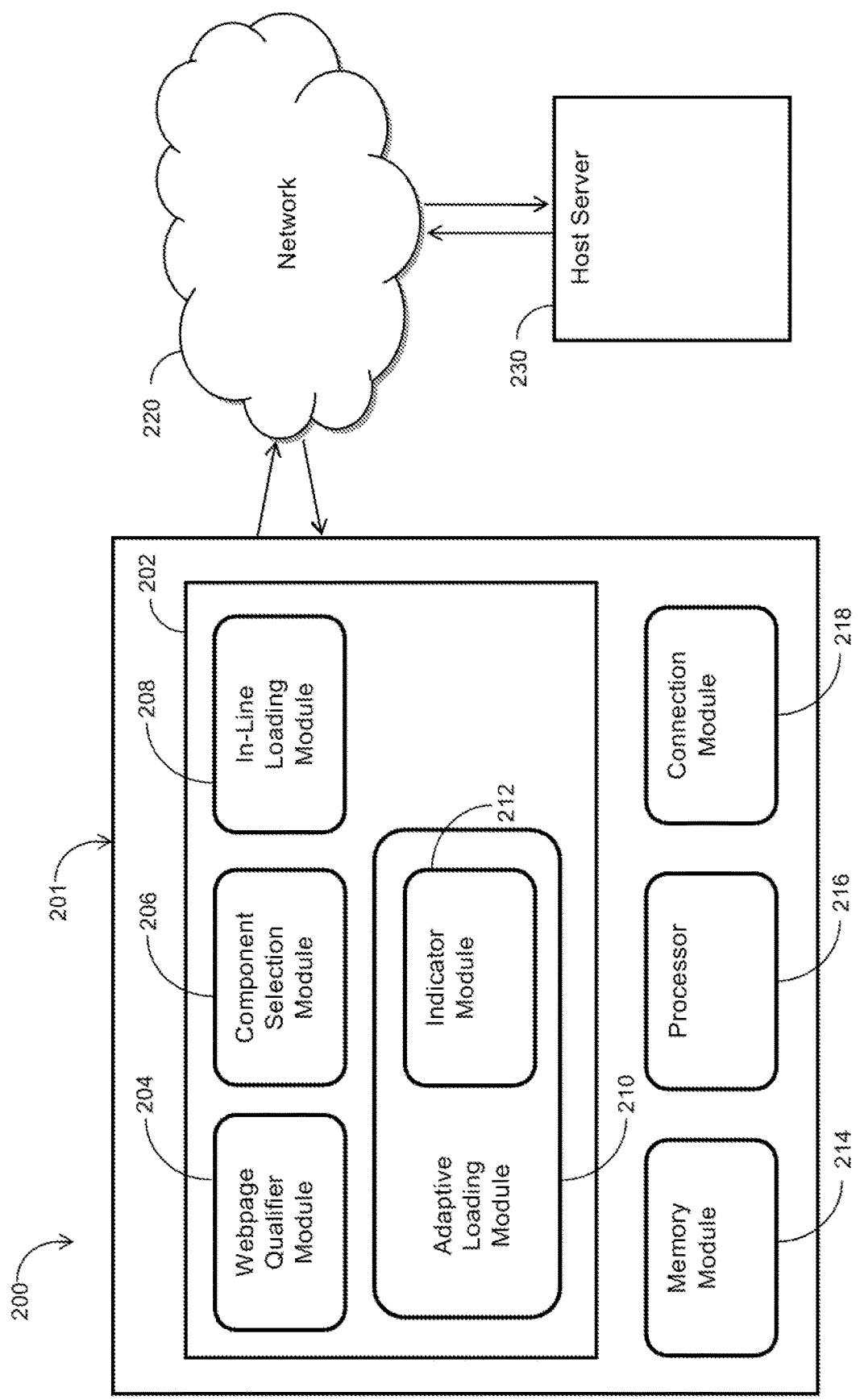
FIG. 1 is a schematic block diagram of a system for loading components of a webpage, according to an embodiment.

FIG. 1 is a schematic block diagram of an embodiment of a system 200 for loading components of a webpage. The system 200 includes a browser 202 located on a user's computing device 201, such as a personal computer, a personal digital assistant, a smart phone, a workstation, a tablet computer, or the like. The computing device 201 further includes a memory module 214, for example at least one database, a processor 216, for executing instructions, and a connection module 218 for transmitting data to and receiving data from the network 220. The processor 216 may be a dedicated processor or may be a central processing unit for the computing device 201. In some cases, the computing device 201 may include a plurality of processors.

The computing device 201 is connected to a network 220. The network 106 may be the Internet, a local area network (LAN), a wide area network (WAN), a personal area network (PAN), an enterprise network, a virtual private network (VPN), or the like.

The browser 202 includes modules configured to dynamically load a webpage. In this embodiment, the browser includes a webpage qualifier module 204, a component selection module 206, an in-line loading module 208 and an adaptive loading module 210.

The webpage qualifier module 204 produces a webpage request and sends the request to the host server 230 via the connection module 218. When the host server 230 sends the webpage data, the webpage qualifier module 204 receives and parses the data in order to identify components of the requested webpage and data associated with the components. In some cases, the webpage qualifier module 204 makes preliminary assessments of the components to be loaded. For example, the webpage qualifier module 204 may receive or estimate loading factors, for example, the processor load that a component may consume, the time a component may take to load, the hyperlink density within a component (e.g., an indicator of the number of sub-components), or the like.

The webpage qualifier module 204 is operatively connected with the component selection module 206. The component selection module 206 determines how each of the plurality of components that make up the webpage is to be loaded. The component selection module 206 then passes each component to either of the in-line loading module 208 or the adaptive loading module 210. The in-line loading module 208 loads the components that are selected to be loaded in-line while the adaptive loading module 210 loads the components that are selected to be loaded adaptively.

In some cases, the system 200 is configured such that the in-line components are loaded first, followed by the adaptively loaded components. In other cases, the in-line components are loaded after or concurrently with the adaptively loaded components. In some cases, a user selection determines if components are loaded in-line or are loaded adaptively. The user selection may be based on predetermined browser settings and may be stored in the memory module 214 of the computing device. The memory module 214 may store data exclusively for the system 200 or may be a shared memory module used by other applications on the computing device 201.

In another case, the selection of whether a component is to be loaded in-line or loaded adaptively is determined by the component selection module 206 using a predetermined algorithm. The algorithm may be stored in the memory module 214. In particular, the predetermined algorithm may be configured to weigh various aspects of the components and various aspects of the webpage overall to determine if a particular component should be loaded in-line or adaptively. Aspects that may be considered include, for example, the type of content included in the component, the function of the component, the size of the component compared with the overall size of the webpage, load data in the source code by the webpage developer, or the like In some cases, the algorithm used by the component selection module 206 may be superseded by user selection.

The in-line loading module 208 loads components in a predetermined order, either set by the browser 202 or predetermined by a webpage designer, for example, in an order specified in the webpage source code.

The in-line loading technique may, in some circumstances, cause slower rendering of components of the webpage than adaptive loading but is intended to reduce overall load time and be less resource intensive on the computing device 201 or server 230 due to fewer requests by the webpage qualifier module 204 needing to be processed. In some cases, the in-line loading approach may cause spikes of activity on the host server 230 due to the number of requests happening within a short period of time.

The adaptive loading module 210 determines a loading hierarchy for the webpage components. The loading hierarchy may be based on a plurality of criteria to determine a loading order. Based on a loading hierarchy, the adaptive loading module 210 loads in a controlled way and, in some cases, may involve serializing the loading of components in the loading order to reduce the point-in-time load on the server 230. The adaptive loading module 210 retrieves the component from the host server 230 in the determined loading order.

In some cases, the adaptive loading module may include an indicator module 212. While the adaptive loading module 210 is retrieving the component, the indicator module 212 indicates to the user that more data is being retrieved from the host server 230.

The adaptive loading module 210 is configured to load the components based on the determined loading order. The adaptive loading module 210 retrieves and loads the components by issuing subsequent request to the host server 230 for each component.

In an embodiment, the loading hierarchy used by the adaptive loading module 210 may be based at least in part on resource load on the host server. In some cases, the loading hierarchy is based on metrics designed to limit resource load on the host server 230. The adaptive loading module 210 may query the host server 230 to determine the current resource load on the host server 230 compared to the maximum load. Based on a response, the adaptive loading module 210 may modify the loading hierarchy to reorder the loading of components based on the size and loading time attributable to each component. The adaptive loading module 210 may also amend the frequency of the subsequent requests for components based on the resource load of the host server 230.

In some cases, the loading hierarchy of the adaptive loading module 210 is based on a predetermined setting for the browser 202, for example the browser performance, the browser's ability to support certain types of components, or the like. For example, the adaptive loading module 210 orders the loading of the components in a manner that is intended not to overload or minimally burden the modules and processor of the computing device 201. In other embodiments, the adaptive loading module 210 can take into account the server 230 or browser performance on a recent component rendering or on a metric of previous sets of component renderings. The metric may be captured by the adaptive loading module 210 and may be stored in the memory module 214. In some cases, prior to determining the order to load the components the adaptive loading module 210 may retrieve the metrics and determine the loading order at least in part based on the metrics.

In some other cases, the loading hierarchy of the adaptive loading module 210 is based at least in part on programming or source code which includes loading data provided by a webpage developer. For example, certain elements in the programming code for the webpage may be used by the adaptive loading module 210 to weight the components to determine the loading order.

In other cases, the loading hierarchy of the adaptive loading module 210 may be based on historical assessments of how the webpage and its components were previously loaded. For example, the adaptive loading module examines the historical assessment of which components have historically required a lot of resources or have historically taken a longer time to load. In some cases, the adaptive loading module 210 uses historical assessments of the user. For example, if a user first clicks on or mouses over one component once the webpage is loaded over a series of loads, this component could be advanced in the hierarchy. In a further case, the adaptive loading module 210 may use historical assessments retrieved from the host server in relation to a plurality of users' historical assessments.

In a further case, the loading hierarchy of the adaptive loading module 210 may be based at least in part on user selected preferences. For example, the user selected preferences determine which components the user would like at or near the top of the loading hierarchy.

In further cases, the adaptive loading module may be configured to combine a plurality of loading criteria, for example, a combination of host server resource load, webpage developer inputs, user selected preferences, historical assessments, and the like. The adaptive loading module may rank the criteria and weight the criteria based on the ranking. In other cases, the user may determine the rank of the criteria and the adaptive loading module 210 may appropriately weight the criteria based on the user ranking. The loading hierarchy is intended to improve the responsive interaction between the user and the webpage by allowing components to load in an order that is intended to create a positive user experience.

With the adaptive loading technique carried out by the adaptive loading module 210, the loading of the webpage is intended to be both responsive to the user and the resource load on the host server 230. Particularly, the webpage is intended to be loaded in a way that provides some component features initially, and then splits up the resource load on the host server 230 by allowing for the more resource intensive components to be loaded over a period of time.

In some cases, the adaptive loading module 210 is preceded by the in-line loading module 208 which is intended to enhance user responsiveness and resource use. The in-line loading module 208 displays some of the components of the webpage and does not require waiting for subsequent requests. The remaining components may be loaded by the adaptive loading module 210 using an approach that is sensitive to the resources of the host server 230. In other cases, the adaptive loading module 210 and in-line loading module 208 are intended to run in parallel.

Figure 2:
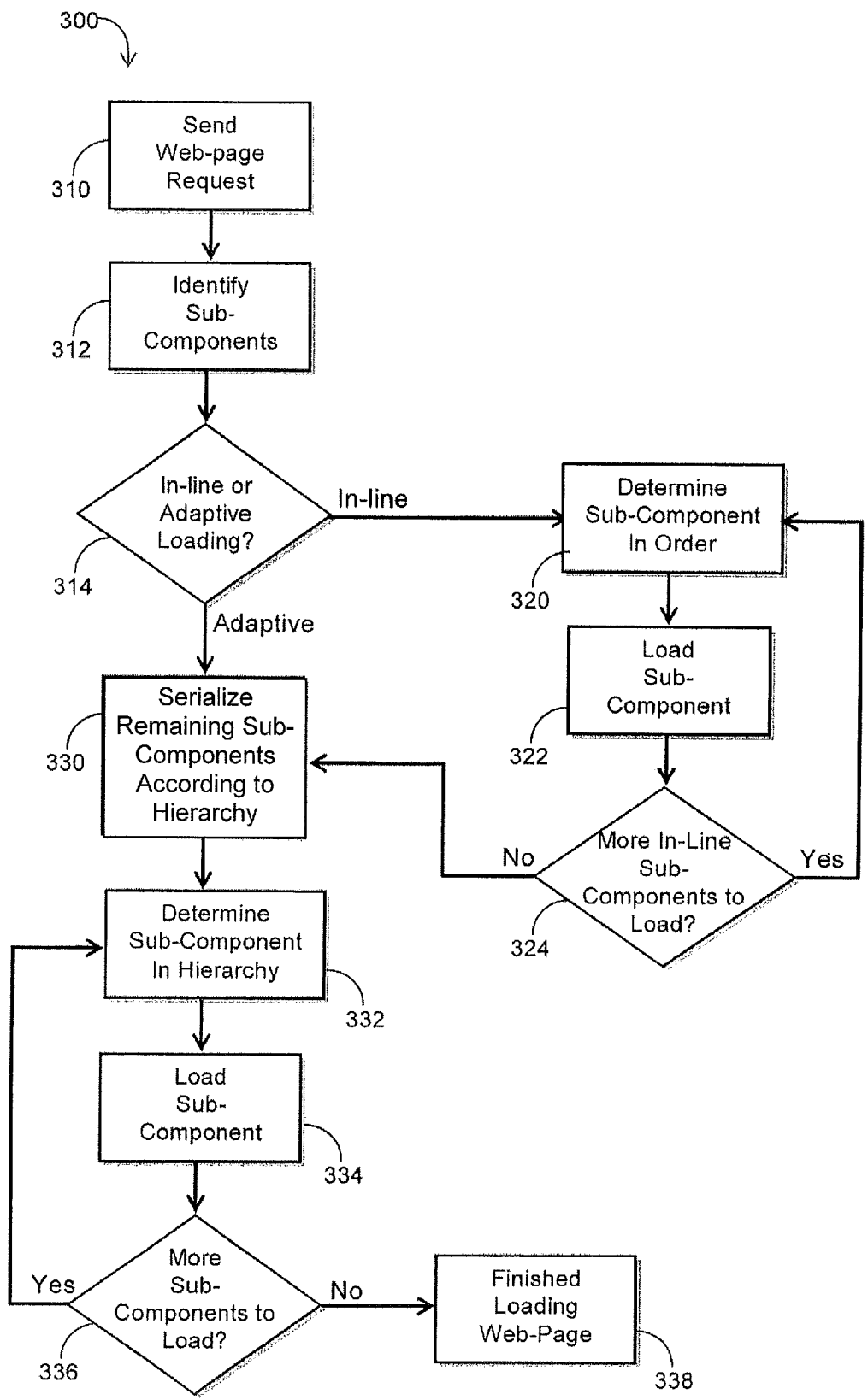
FIG. 2 is a flowchart of a method for loading components of a webpage, according to an embodiment.

FIG. 2 illustrates a method 300 for dynamically loading a webpage. At 310, a webpage request is sent from the browser 202 to the host server 230 over the network 220. At 312, the webpage qualifier module 202 parses the data of the webpage by identifying components of the webpage.

At 314, the components are selected by the component selection module 206 to be loaded via an in-line approach or an adaptive approach. The selection is based on a plurality of attributes, for example, a user selection of settings, a predetermined algorithm, aspects related to resource load, component size, developer input, system load, or the like as discussed above.

The system 200 further determines an order for the components that are selected to be loaded in-line. The order of component loading may be based on, for example, the order by which components are to appear in the browser's display, for example from top to bottom or an order by which components appear in the programming source code. At 320, the component order is determined. At 322, the component ranked next to be loaded is loaded by the in-line loading module 208. At 324, if there are more components to be loaded in-line, in-line component loading will be repeated.

If there are no more components to be loaded in-line at 324, or if no components were selected to be loaded in-line at 314, then at 330 adaptively loaded components are organized according to a loading hierarchy determined by the adaptive loading module 210. In some cases, the adaptive loading module 210 may determine the loading hierarchy and begin loading components while the in-line loading module 208 is loading in-line components.

The loading hierarchy may be based on at least one criteria and is intended but may be more efficient if based on a plurality of criteria, for example, a current load on the host server, a system performance of a device, a system performance of the most recent rendering of the webpage, a system performance of a set of previous renderings of the webpage, loading data in code for the webpage from the webpage's developer, a history of utilization and loading of the webpage for at least one user or a plurality of users, or the like as described above. The loading hierarchy will determine the loading order for the adaptively loaded components.

At 332, the component to be loaded is determined by the loading hierarchy. At 334, the component is loaded by the adaptive loading module 210. At 336, if there are more components to be loaded adaptively, component determination will be repeated. If there are no more components to be loaded, the webpage will be finished loading at 338.

As noted by the dotted lines in FIG. 2, a decision with regard to in-line loading or adaptive loading of a component may also be made on a component by component basis, particularly in a situation where each component may have a plurality of sub-components.

Figure 3:
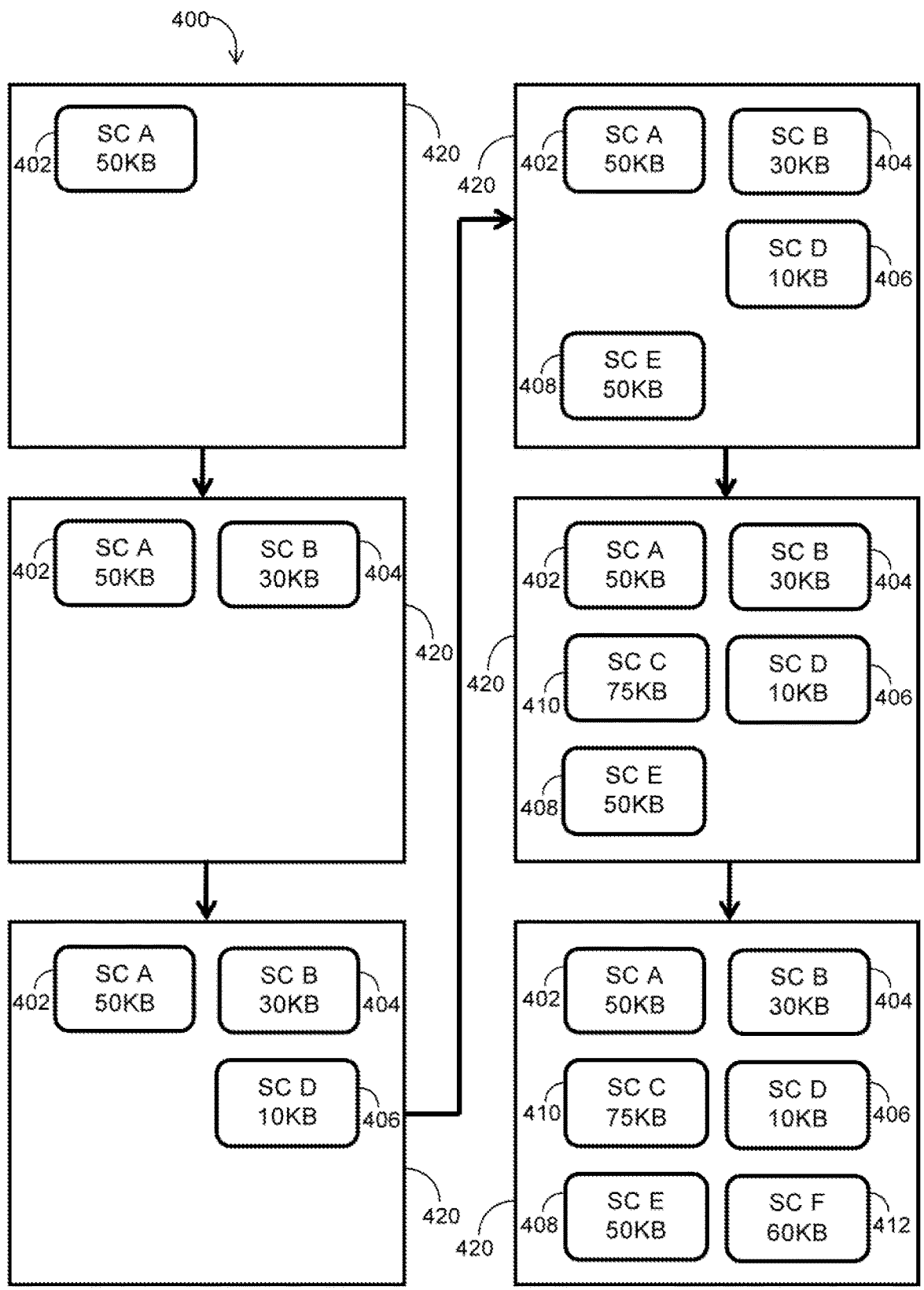
FIG. 3 is a diagram illustrating an example loading order of webpage components according to a method for loading components of a webpage such as, for example, the method illustrated in FIG. 2.

FIG. 3 is a diagram illustrating one example 400 of a loading order of webpage components through a sequence of browser displays. In this example, webpage qualifier module 204 identifies six webpage components (WC), labeled as A through F. The webpage qualifier module 204 further determines that components A and B are to be loaded in-line and components C through F are to be loaded adaptively. In a specific example, the determination of in-line or adaptive loading is based on source code loading data provided by the webpage developer indicating which components are intended to be loaded using an in-line loading technique.

The browser display 420 shows component A 402 being loaded first according to the in-line loading approach. Out of the components chosen to be loaded in-line, the position of component A 402 is closest to the top of the browser, and is the leftmost component. As such, the system 200 determines that component A 402 is to be loaded first. The browser display 420 the shows the next component to be loaded in-line; component B 404 is loaded next alongside component A 402. In the in-line loading approach, resource load or loading time of the webpage components are not taken into account when determining the order of component loading. Therefore, even though the size of component A 402 may be larger, for example 90 kilobytes (kB), than component B 404, which may be, for example, 80 kB, component A 402 is loaded first.

The browser display 420 may then load the adaptively loaded components. The adaptive loading module 210 in this example determines a loading hierarchy using the criteria of the resource load on the host server and the history of the user. In the browser display 420, component D 406 is the first component loaded by the adaptive loading module 210 as component D is relatively small, for example 100 kB, which will result in low resource load on the host server.

The browser display 420 further illustrates loading the next webpage component, which, in this example, is component E 408. Out of the three remaining webpage components, component E 408 is the smallest in size at 150 kB and results in the lowest resource load on the host server 230. As shown, although component E 408 is in a lower position on the webpage than, for example, component C 410, this does not prevent component E 408 from being loaded earlier.

The browser display 420 illustrates component C 410 as the next component to be loaded. Out of the two remaining components, the 375 kB size of component C 410 is larger than component F 412, which has a size of 260 kB. However, due to the hierarchy criteria of user history, component C 410 is loaded earlier because the specific user's history shows that the user uses component C 410 more frequently. The browser display 420 shows the last webpage component, component F 412 as loaded. All the components have then been loaded and the webpage is finished loading.

In the preceding description, for purposes of explanation, numerous details are set forth in order to provide a thorough understanding of the embodiments. However, it will be apparent to one skilled in the art that specific details may not be required. In other instances, well-known structures are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

I claim:

1. A system for dynamically loading a webpage comprising:
   one or more processors configured to:
      receive a user requested webpage from a host server and further configured to identify a plurality of components of the webpage;
      determine a loading method for each component based at least in part on one or more loading factors associated with the corresponding component, wherein the loading method may be either in-line loading or adaptive loading, wherein the one or more loading factors comprises a current load of a server associated with the webpage;
      load components determined to be in-line components; and
      determine a loading hierarchy for adaptive loading components and load components based at least in part on the loading hierarchy, wherein the loading hierarchy is determined at least in part on historical viewing information associated with a user;

one or more memories coupled to the one or more processors and configured to provide the one or more processors with instructions.

2. The system of claim 1, wherein the one or more processors are further configured to indicate to a user that a component is not fully loaded.

3. The system of claim 1, wherein the one or more processors are further configured to determine the loading method based at least in part on user preferences.

4. The system of claim 1, wherein the one or more processors are further configured to determine the loading hierarchy based at least in part on metrics related to resource load on the host server.

5. The system of claim 1, wherein the one or more processors are further configured to determine the loading hierarchy based at least in part on metrics related to previous loading of the webpage for the user.

6. The system of claim 1, wherein the one or more processors are further configured to determine the loading hierarchy based at least in part on metrics related to previous loading of the webpage wherein the metrics are stored on the host server.

7. The system of claim 1 wherein the one or more processors are further configured to determine the loading hierarchy based at least in part on historical webpage loading assessments.

8. The system of claim 7 wherein the historical assessments are based on the history of the user.

9. The system of claim 7 wherein the historical assessments are based on the history of a plurality of users.

10. The system of claim 1 wherein the adaptive loading module determines the loading hierarchy based at least in part on user preferences.

11. The system of claim 1, wherein the one or more loading factors associated with the corresponding component include one or more of a hyperlink density, a size of the corresponding component in relation to the requested web page, a user preference, or load data included in the requested web page.

12. The system of claim 1, wherein the loading method for each component is determined based at least in part on source code loading included in connection with the webpage.

13. The system of claim 1, wherein the historical viewing information associated with the user comprises one or more inputs received from the user in connection with a previous loading of the webpage.

14. A method for dynamically loading a webpage comprising:
   identifying a plurality of components of the webpage;
   determining a load method for each component based at least in part on one or more loading factors associated with the corresponding component, wherein the loading method may be in-line loading or adaptive loading, wherein the one or more loading factors comprises a current load of a server associated with the webpage;
   loading components determined to be in-line components using in-line loading;
   determining a loading hierarchy for components determined to be adaptive components, wherein the loading hierarchy is determined at least in part on historical viewing information associated with a user; and
   loading adaptive components using adaptive loading based on the loading hierarchy.

15. The method of claim 14 wherein the loading using in-line loading comprises loading the components in a predetermined order.

16. The method of claim 14 wherein determining a loading hierarchy and loading adaptive components occurs in parallel with loading in-line components.

17. The method of claim 14 further comprising indicating to a user that a component is in the process of being loaded.

18. The method of claim 14 wherein the determining of the loading method is based on user selection.

19. The method of claim 14 wherein the determining of the loading method is based on predetermined metrics.

20. The method of claim 14 wherein the loading hierarchy is further based on at least one metric selected from the group of: current resource load on a host service; system performance of a user computing device; system performance of previous webpage loading; source code of the webpage; historical assessment of the webpage loading; and user preferences.

* * * * *